United States Patent [19]

Kacheria

[11] Patent Number: 5,479,322
[45] Date of Patent: Dec. 26, 1995

[54] LIGHTING SYSTEM AND METHOD FOR FIBER OPTIC AND AREA ILLUMINATION

[75] Inventor: Nilesh P. Kacheria, Bombay, Ind.

[73] Assignee: Fiberstars, Inc., Fremont, Calif.

[21] Appl. No.: 89,988

[22] Filed: Jul. 16, 1993

[51] Int. Cl.$^6$ .................... F21V 7/04; F21V 8/00
[52] U.S. Cl. .............. 362/32; 362/290; 362/294; 362/373
[58] Field of Search .............. 362/32, 6, 9, 290, 362/294, 297, 298, 301, 342, 373

[56] References Cited

U.S. PATENT DOCUMENTS

| | | | |
|---|---|---|---|
| 2,033,235 | 3/1936 | Ferree et al. | 362/290 |
| 4,025,779 | 5/1977 | Ahroni | 240/10 L |
| 4,037,096 | 7/1977 | Brendgord et al. | 362/298 |
| 4,755,918 | 7/1988 | Pristash et al. | 362/32 |
| 4,922,385 | 5/1990 | Awai | 362/294 |
| 5,099,399 | 3/1992 | Miller et al. | 362/32 |

FOREIGN PATENT DOCUMENTS

| | | | |
|---|---|---|---|
| 2219068 | 11/1989 | United Kingdom | 362/346 |
| WO9111743 | 8/1991 | WIPO | G02B 23/26 |

OTHER PUBLICATIONS

Gardco Lighting, "Outdoor Lighting", 1990, pp. 2–15.

Primary Examiner—Ira S. Lazarus
Assistant Examiner—Y. Quach
Attorney, Agent, or Firm—Albert C. Smith

[57] ABSTRACT

A method and apparatus for lighting optical fibers as well as surrounding regions includes a generally vertically oriented housing including a light source positioned near the upper end of the housing for directing radiant flux toward the ends of a plurality of optical fibers and for reflecting remaining portions of the radiant flux from the light source in a lateral direction into the surrounding regions. A light reflector is positioned in the housing for laterally reflecting a portion of the radiant flux, and includes a central aperture in the reflector to pass the central portion of the radiant flux therethrough to the ends of the optical fibers. The same reflector serves as a baffle on the lower side thereof to deflect moving air within the housing around the ends of the optical fibers and through the aperture in the reflector toward the light source. A fan disposed below the baffle in the housing moves ambient air through an opening in the lower portion of the housing and around the ends of the optical fibers and through the aperture in the reflector toward the light source for venting thereafter through the upper portion of the housing. The reflector and baffle also supports the optical fibers in alignment with the central portion of the radiant flux from the light source through the aperture in the reflector.

16 Claims, 4 Drawing Sheets

LIGHTING SYSTEM AND METHOD FOR FIBER OPTIC AND AREA ILLUMINATION

FIELD OF THE INVENTION

This invention relates to light sources for optical fibers and more particularly to light sources for exterior installation to provide aesthetically-pleasing area lighting as well as to supply high-intensity light flux to optical fibers.

BACKGROUND OF THE INVENTION

Optical fibers are commonly used to provide aesthetically-pleasing lighting effects to highlight features and borders of buildings, landscapes, swimming pools, and the like. These exterior lighting installations typically require waterproof light sources that must be located close to the features or borders that are to be highlighted by light emitted from the optical fibers in order to preserve high intensity illumination over the length of the optical fibers. Lighting of this type commonly relies upon plastic optical fibers for low cost, flexibility, and immunity from weather conditions, but such fibers require significant cooling at the input ends in order to avoid melting and deterioration attributable to high-intensity light sources operated in close proximity to the fibers. Certain known light sources for exterior installations to provide light flux to optical fibers rely upon a pair of windows that are interposed between fiber ends and light source and that are spaced apart along the direction of illumination supplied to the ends of optical fibers in order to pass cooling air between the spaced windows (See, for example, U.S. Pat. No. 4,763,984). One disadvantage of light sources of this type is that the composite unit is unsightly and typically must be installed at substantial distance away from the features or borders that are to be lighted by the optical fibers which are illuminated by such light source.

SUMMARY OF THE INVENTION

In accordance with the present invention, a 'bollard'-style lighting fixture is arranged in substantially vertical orientation for installation in a region or locale that is to be generally illuminated and that is close to the features or borders which are to be illuminated by optical fibers that receive light flux from such lighting fixture. A high-intensity light source is disposed near the upper end of the fixture to direct illumination downward toward a baffle and reflector structure which includes a central aperture that aligns with the ends of a plurality of optical fibers. A central portion of the light flux from the light source is oriented to pass through the central aperture to the ends of the optical fibers, and another portion of the light flux is reflected from the upper surface of the baffle and reflector structure in a lateral direction relative to the vertical orientation of the lighting fixture into the surrounding area that is to be illuminated. The lower surface, or surfaces, of the baffle and reflector structure tapers toward the central aperture to concentrate the flow of air moving upwardly within the lighting fixture around the ends of optical fibers that are positioned near the central aperture in the baffle and reflector structure. A fan is positioned below the baffle and reflector structure in order to move air upwardly through the lighting fixture from an inlet port near the lower end of the lighting fixture, around the ends of optical fibers near the central aperture, and through the central aperture toward the light source. The cooling air at elevated temperature from within the lighting fixture may be vented through a weatherproof dome near the upper end of the lighting fixture. The baffle and reflector structure may be segregated into several segments relative to the central aperture to provide a convenient installation and mounting structure for retaining the ends of the optical fibers in alignment with the central aperture in the baffle and reflector structure through which the central portion of light flux from the light source passes.

DESCRIPTION OF PREFERRED EMBODIMENT

Figure 1:
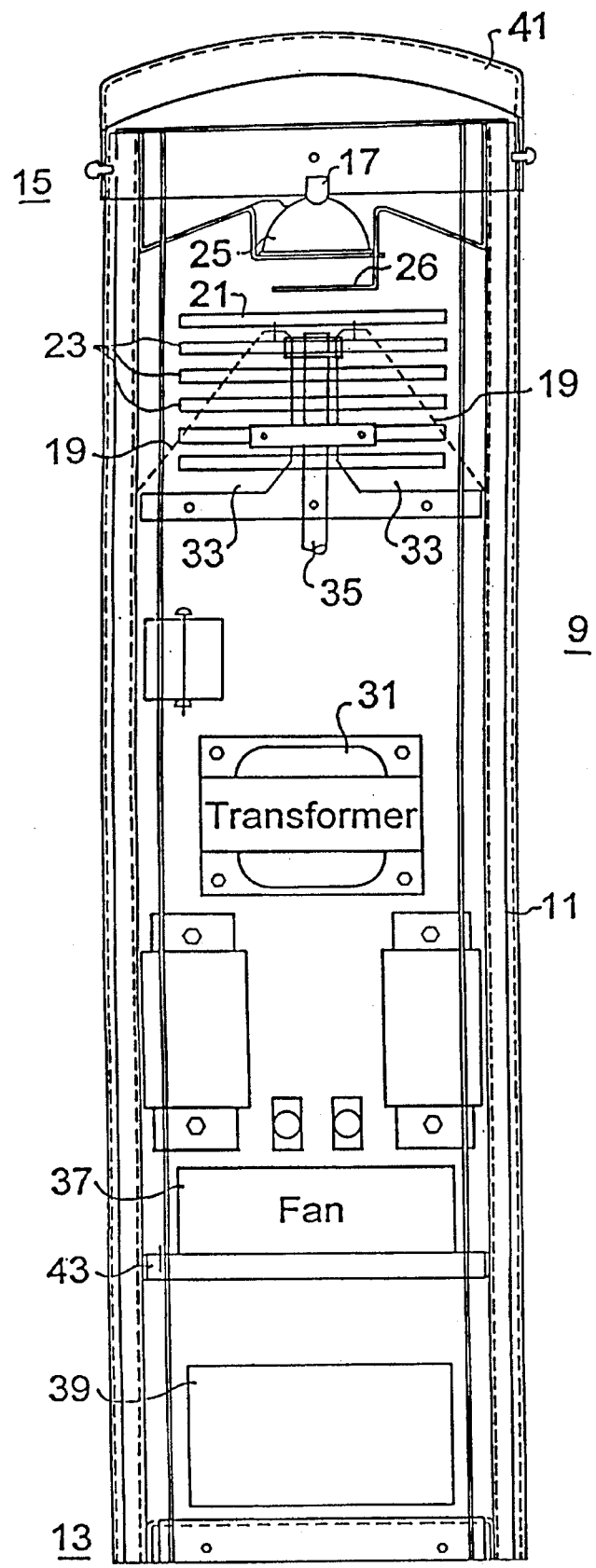
FIG. 1 is a front view of the lighting fixture according to the present invention.
Figure 2:
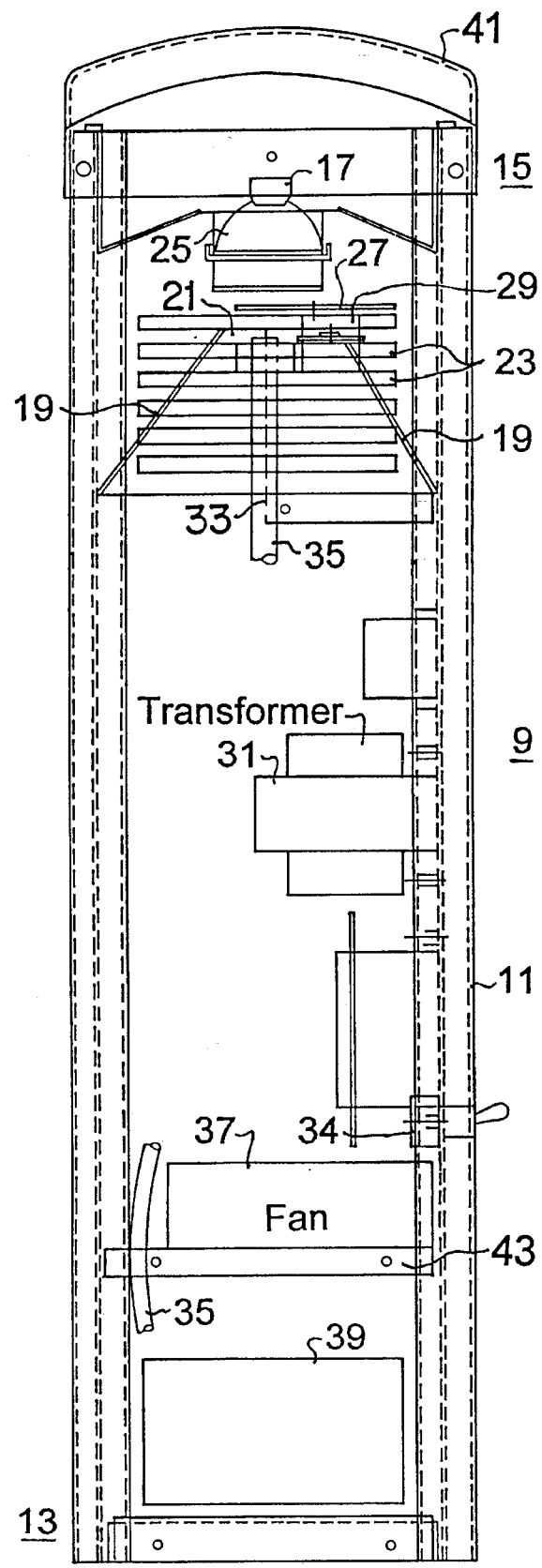
FIG. 2 is side view of the lighting fixture of FIG. 1.

Referring now to FIGS. 1 and 2, there are shown front and side views, respectively, of a bollard-style lighting fixture 9 that is generally vertically oriented within a housing 11 that extends from a lower end 13 to an upper end 15. A light source 17 is disposed near the upper end 15 of the housing 11 to direct radiant flux downwardly into the housing 11. This light source 17 may include a conventional high-intensity, low-voltage halogen-type filament bulb, or a high-intensity, gas-discharge lamp, as desired. A baffle and reflector structure 19 having a central aperture 21 therein is positioned below the light source 17 to pass a central portion of the radiant flux from the light source 17, and to reflect a portion of the radiant flux from the light source 17 in a lateral direction relative to the vertical orientation of the housing 11. The radiant flux which is reflected from the upper surface of the baffle and reflector structure 19 is emitted through the optical ports 23 near the upper end 15 of the housing 11, and the upper surfaces of the baffle and reflector structure 19 may be positioned at approximately 45° relative to a central vertical axis of the housing to provide efficient lateral reflection of radiant flux through the optical ports 23. Of course, the baffle and reflector structure 19 may have a general pyramid shape for disposition within a generally square housing 11, and may have a general cone shape for disposition within a cylindrical housing 11.

The central aperture 21 at the upper end of the baffle and reflector structure 19 is substantially aligned with a central axis of the housing 11 to pass therethrough a central portion of the radiant flux from the light source 17. Of course, the light source 17 may include a reflector 25 that is shaped in conventional manner to focus light through the central aperture 21 and onto the ends of optical fibers mounted near the aperture, as later described herein in greater detail. Thus, a predominant portion of the radiant flux from the light source 17 can be focused through the aperture 21 onto ends of optical fibers mounted near the aperture 21, and another portion of the radiant flux from the light source 17 may be reflected from the upper surfaces of the baffle and reflector structure 19 through the optical ports 23 to the adjacent surroundings. For this purpose, the upper surfaces of the baffle and reflector structure 19 may be polished or spectrally reflective, as desired. Optional color filters 26 may be supported adjacent the light source 17. In addition, a color wheel 27 with drive motor 29 may be interposed between the light source 17 and the baffle and reflector structure 19 to provide aesthetically-pleasing colors of light reflected into the surroundings and focused onto the ends of the bundle 35 of optical fibers. Conventional electrical components and circuits including a transformer 31 (e.g., step-up for gas-discharge lamp 17, or step-down for halogen filament lamp 17), and thermal safety cut-out, and fan control, and power switch 34, and the like, may be suitably mounted within the housing 11, as desired.

Figure 3:
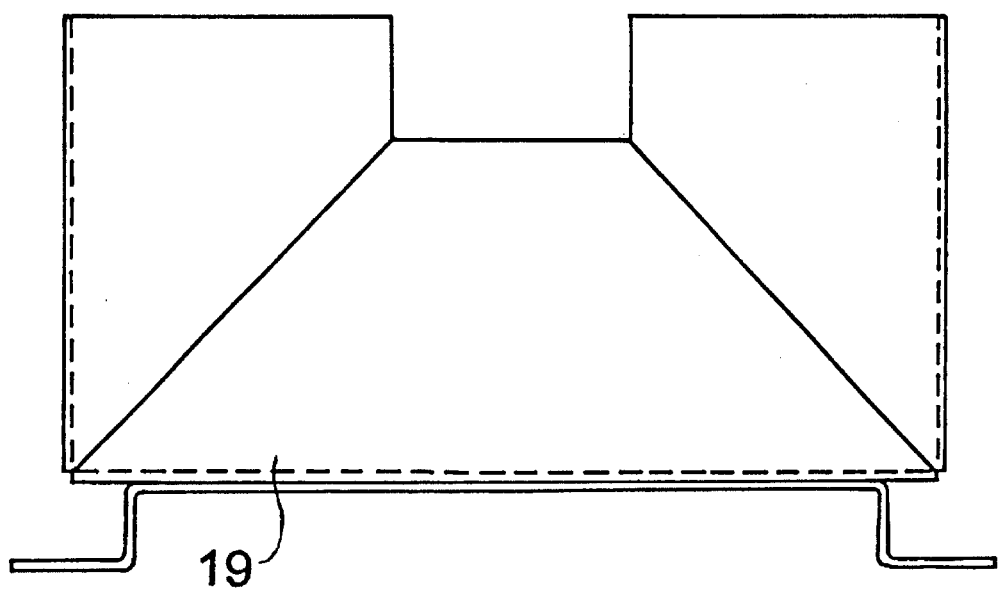
FIG. 3 is a top view of a portion of the baffle and reflector structure of FIG. 1.

Referring now to the top view of FIG. 3, there is shown one bifurcated portion of the baffle and reflector structure 19 that is substantially parted along a central vertical plane, and one such bifurcated portion, as illustrated in FIG. 1, includes integrally-formed tabs 33 lying substantially in the central vertical plane and a mounting structure attached thereto for providing convenient mounting support for a bundle 35 of optical fibers that is thereby retained in alignment with the central aperture 21 to receive the predominant portion of radiant flux from light source 17 focused on the ends of the bundle 35 of optical fibers. The bundle 35 of optical fibers may be routed through the housing 11, as through the plenum 43 past the fan 37 that is positioned above an air inlet port 39 near the lower end 13 of the housing 11, to pass below ground level to selected fiber optic lighting locations. The upper end of the housing 11 may be suitably weather protected by dome 41 to provide an air vent in conventional manner that inhibits incursion of water into the interior of the housing 11.

Figure 4:
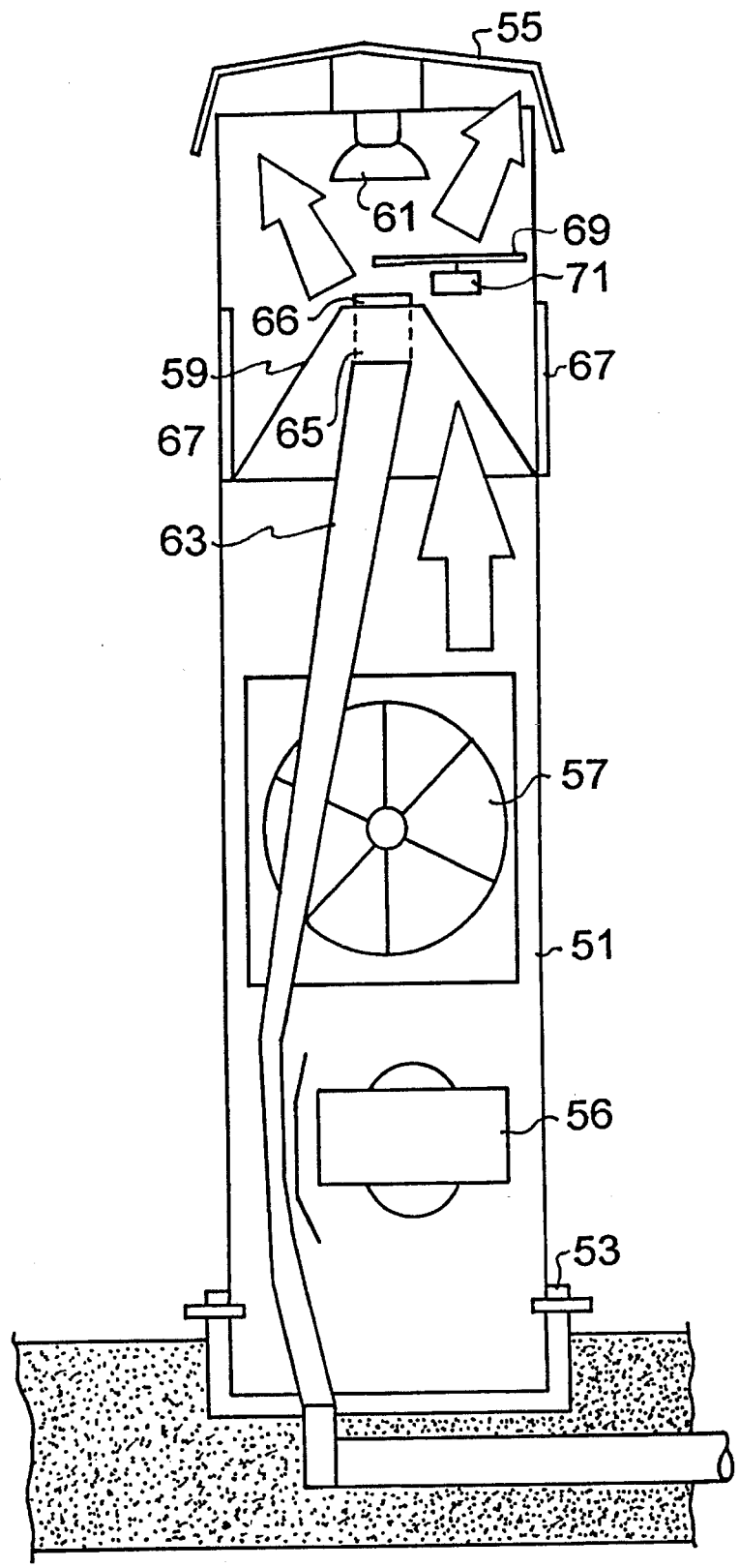
FIG. 4 is a pictoral view of an alternative embodiment of the lighting fixture of the present invention including a round housing and conical baffle.

Referring to FIG. 4, there is shown a pictoral diagram of an alternative embodiment of the present invention assembled within a generally cylindrical outer housing 51. Of course, the outer housing 51 may also have any suitable polygonal shape such as pentagonal, hexagonal, octagonal, and the like, for aesthetic purposes. The outer housing 51 is secured at its lower end in suitable manner to the ground or supporting structure via a mounting bracket 53, and the upper end of the outer housing supports a weather dome 55 that keeps rain out, but passes cooling air from within the outer housing 51. A step-up or step-down transformer 56 and associated circuitry for the lamp 61, fan 57 and color-wheel motor 71 are mounted in the lower portion of the outer housing 51. The fan 57 may be disposed in the lower portion of the outer housing 51 that may be partitioned suitably to create a pressure differential across the fan 57 to force ambient air to flow into the outer housing 51 and through the baffle and reflector structure 59, toward the lamp 61, and out through the dome 55. A cable 63 of optical fibers may be routed through the lower end of the outer housing 51 to a mounting structure 65 attached to the baffle and reflector structure 59 that supports the ends of the optical fibers at the focal point of the lamp 61 near the aperture 66 in the baffle and reflector structure 59. Thus, cooling air is forced via fan 57 to flow into the outer housing 51, around the ends of the optical fibers of cable 63 in the region of the aperture 66 in the baffle and reflector structure 59, around the lamp 61, and out through the dome 55 to the environment. A portion of the light flux from lamp 61 is focused onto the ends of the optical fibers of the cable 63 that are supported near the aperture 66 in the baffle and reflector structure 59, and another portion of the light flux from lamp 61 reflects from the upper reflective surface of the baffle and reflector structure 59 in a substantially lateral direction through the perimeter lens 67 to provide local illumination. A color wheel 69 and associated drive motor 71 may be disposed within a portion of the light flux from lamp 61 to cyclically alter the color of illumination of the optical fibers, as desired.

In each embodiment of the present invention, the baffle and reflector structure 19,59 may be conveniently formed of sheet metal, and the lower surface thereof thus forms an upwardly-tapered conical or pyramidal structure that directs upwardly moving air around the ends of the bundle 35,63 of optical fibers which is positioned near the central aperture 21,66. In this way, the ends of plastic optical fibers in bundle 35,63 that are vulnerable to melting or rapid deterioration at elevated temperatures attributable, for example, to the focused radiant flux from the light source 17,61, may be cooled by the flow of air that is concentrated around such ends during movement of the air through the central aperture 21,66 toward the light source 17,61. The ends of the optical fibers in bundle 35,63 may be positioned at or above or below the edges of the central aperture for maximum cooling by the air moving through the aperture of the baffle and reflector structure 19,59. The light source 17,61 is then also cooled by the moving air before it is vented from the housing 11,51 via the dome 41,55. The fan 37,57 is disposed on a plenum 43 in the housing to draw in ambient cooling air through inlet ports 39 and to create a pressure differential across the fan 37,57 to move air upwardly through the housing 11,51 and through the central aperture 21,66 in the baffle and reflector structure 19,59. Of course, the fan 37,57 may be disposed above the baffle and reflector structure 19,59 to draw air through the central aperture 21,66, and the vertical orientation of the components of the present invention may also be inverted to provide lateral emission of a portion of the radiant flux from light source 17,61 through optical ports located near the lower end of the housing, with the light source 17,61, baffle and reflector structure 19,59, fan 37,57 and inlet port 39 in the same relative, but inverted, orientation. Alternatively, the light source 17,61 may be oriented to direct light flux upwardly, towards ends of optical fibers in a bundle 35,63 thereof that are routed out of the housing 11,51 in a convenient manner. In such orientation of the light source 17,61 and ends of the optical fibers, the baffle and reflector structure 19,59 may be inverted to taper upwardly and outwardly on the reflector surface, and to taper downwardly and inwardly toward the central aperture on the baffle surface. A fan may be oriented within the housing to draw or force air through the central aperture 21,66 in this alternative configuration.

Therefore, the lighting fixture of the present invention efficiently utilizes the total radiant flux from a light source to illuminate surrounding areas as well as to supply radiant flux to a bundle of optical fibers in a manner that concentrates air flow within the lighting fixture to protect the optical fibers from operation at elevated temperatures.

What is claimed is:

1. Lighting apparatus for a plurality of optical fibers comprising:

a housing disposed in vertical orientation between upper and lower ends thereof and including at least one aperture positioned near one of the upper and lower ends thereof to admit ambient air into the housing;

a light source disposed within the housing and positioned to direct radiant flux within the housing;

a baffle disposed within the housing near the light source with a first surface thereof oriented to reflect a portion of radiant flux from the light source toward a lateral direction relative to the vertical orientation of the housing, the baffle including an aperture for passing another portion of radiant flux from the light source therethrough to ends of the plurality of optical fibers disposed in alignment with the aperture in the baffle;

an optical port oriented in the housing to emit the reflected radiant flux away from the housing; and a fan disposed within the housing relative to the baffle to direct air through said aperture in the baffle to concentrate the flow of air around the ends of optical fibers positioned near the aperture in the baffle, and through said aperture in the baffle toward the light source.

2. The lighting apparatus according to claim 1 wherein the light source is disposed near the upper end of the housing to direct radiant flux therefrom downwardly within the housing; and the baffle is disposed within the housing beneath the light source with the first surface oriented to reflect a portion of the downwardly-directed radiant flux toward the optical port, and includes the aperture in a central upper region thereof passing radiant flux from the light source therethrough to ends of the plurality of optical fibers positioned in alignment with the aperture in the baffle.

3. The lighting apparatus according to claim 2 comprising:

a cap positioned at the upper end of the housing for shielding the light source from weather; and a vent is disposed near the upper end of the housing to pass air from within the housing that passed through the aperture in the baffle.

4. The lighting apparatus according to claim 1 wherein said light source includes a reflector concentrating said another portion of the radiant flux therefrom toward ends of optical fibers disposed near the aperture in the baffle.

5. The lighting apparatus according to claim 1 comprising:

mounting means near the lower end of the housing for mounting the housing in vertical orientation, the mounting means including an opening therein for positioning optical fibers therethrough.

6. The lighting apparatus according to claim 1 wherein the housing is substantially square; and the baffle includes substantially pyramidal first surfaces aligned substantially with the optical port in the housing, and includes second surfaces tapering toward the aperture in the baffle for directing air flow therethrough.

7. The lighting apparatus according to claim 6 wherein the baffle includes tabs oriented about a substantially vertical plane below the aperture in the baffle, and the ends of optical fibers are supported on the tabs in substantial alignment with a vertical plane.

8. The lighting apparatus according to claim 1 wherein the housing is substantially round; and the baffle includes a substantially conical first surface aligned substantially with the optical port in the housing, and includes a second surface tapering toward the aperture in the baffle for directing air flow therethrough.

9. The lighting apparatus according to claim 1 wherein the light source includes electrical components mounted within the housing for supplying power to the light source; and the electrical components are interposed between the fan and baffle within the housing for cooling the electrical components in the flow of air prior to concentrating the flow of air around the ends of the optical fibers.

10. The lighting apparatus according to claim 1 wherein the light source includes electrical components mounted within the housing for supplying power to the light source; and the fan is interposed between the electrical components and the baffle within the housing.

11. A method for lighting a plurality of optical fibers and surrounding region from a unit having a light source within a housing that includes an optical port and that is disposed to be mounted in the region, the method comprising the steps of:

orienting the housing with upper and lower ends thereof in vertical orientation;

positioning the light source within the housing near an upper end thereof to direct radiant flux downwardly within the housing;

focusing one portion of the light flux from the light source that is directed downwardly within the housing towards ends of the optical fibers, and reflecting another portion of the radiant flux from the light source substantially laterally of the downward direction;

emitting the reflected radiant flux through the optical port of the housing to the surrounding region;

supporting ends of the plurality of optical fibers substantially in alignment with the downward direction of said focused one portion of the radiant flux;

admitting ambient air into the housing below the ends of the optical fibers;

moving the air admitted into the housing in substantially upward direction therein and concentrating the moving air around the ends of optical fibers positioned to receive the one portion of radiant flux from the light source; and moving the air from around the ends of optical fibers in substantially upward direction toward the light source.

12. The method according to claim 11 wherein the step of moving air from around the ends of optical fibers upward toward the light source cools the light source; and includes the step of venting from within the housing near the upper end thereof the air that moves upward past the light source to cool the light source.

13. The method of lighting optical fibers and surrounding region according to claim 12 in which a baffle having upper and lower opposed surfaces and having an aperture therethrough is disposed within the housing, wherein in the step of moving air admitted into the housing, the air is concentrated via the lower surface of the baffle moving through the housing to flow about ends of optical fibers that are disposed in alignment with the aperture through the baffle to receive the one portion of the radiant flux from the light source, and the step of reflecting another portion of the radiant flux from the light source is via the upper surface of the baffle and through the optical port in the housing.

14. The method according to claim 11 wherein in the step of focusing, said one portion is a central portion of the radiant flux from the light source that is focused on ends of optical fibers positioned within the housing at a location at which moving air is concentrated to flow around said ends.

15. The method according to claim 11 wherein in the step of supporting, the ends of the plurality of optical fibers are aligned to receive the downwardly directed one portion of the radiant flux from the light source and are positioned for cooling of the ends at the concentration of moving air.

16. The method according to claim 10 comprising the step of:

directing a plurality of optical fibers through the lower end of the housing.

* * * * *